United States Patent [19]
Fujimoto et al.

[11] Patent Number: 5,373,523
[45] Date of Patent: Dec. 13, 1994

[54] EXCIMER LASER APPARATUS

[75] Inventors: Junichi Fujimoto; Hakaru Mizoguchi; Yoshiho Amada; Osamu Wakabayashi, all of Hiratsuka, Japan

[73] Assignee: Kabushiki Kaisha Komatsu Seisakusho, Tokyo, Japan

[21] Appl. No.: 136,448

[22] Filed: Oct. 14, 1993

[30] Foreign Application Priority Data

Oct. 15, 1992 [JP] Japan .................................. 4-301551
Nov. 5, 1992 [JP] Japan .................................. 4-321249
Dec. 17, 1992 [JP] Japan .................................. 4-355011

[51] Int. Cl.$^5$ .............................................. H01S 3/22
[52] U.S. Cl. ........................................ 372/59; 372/57; 372/34; 372/98; 372/103; 372/109
[58] Field of Search ................... 372/57, 59, 58, 98, 372/103, 109; 378/705

[56] References Cited

U.S. PATENT DOCUMENTS

| | | | |
|---|---|---|---|
| 4,891,818 | 1/1990 | Leather | 372/57 |
| 5,001,873 | 3/1991 | Rufin | 372/57 |
| 5,018,161 | 5/1991 | Akins et al. | 372/57 |
| 5,027,366 | 6/1991 | Akins et al. | 372/57 |
| 5,029,177 | 7/1991 | Akins et al. | 372/57 |

FOREIGN PATENT DOCUMENTS

| | | | |
|---|---|---|---|
| 60-26312 | 6/1985 | Japan . | |
| 003894A | 1/1987 | Japan | 372/705 |
| 2-147491 | 5/1990 | Japan . | |
| 4-137574 | 5/1992 | Japan . | |
| 58186985 | 11/1993 | Japan . | |

OTHER PUBLICATIONS

Roger Tennant, "Control of Contaminants in XeCL Lasers", *Laser Focus*, Oct., 1981, pp. 65-68.

*Primary Examiner*—Léon Scott, Jr.
*Attorney, Agent, or Firm*—Richards, Medlock & Andrews

[57] ABSTRACT

An excimer laser apparatus is provided with a compact high efficiency dust particle removal means which is capable of maintaining the windows clean with only a small volume of purging gas, and which prevents deterioration of aperture masks without having to increase the cavity length or risking the possibility of leakage from piping connections. The excimer laser apparatus uses, as dust particle removal means, filters (13a and 13b) made of metal or ceramic which is non-reactive with fluorine. A ground potential dust collector can be provided at a downstream side of a static dust particle remover, having an anode and a cathode, for collecting any dust particles which have passed through the static dust particle remover. In addition, clean laser medium gas can be introduced into subchambers (14a and 14b) through gas introducing passages (11a and 11b) provided in the walls of the housing (1) and then into the laser chamber (12) through labyrinths (8a and 8b) without disturbing the clean gas which stays near the internal surfaces of the windows (6a and 6b).

20 Claims, 6 Drawing Sheets

EXCIMER LASER APPARATUS

FIELD OF THE INVENTION

The present invention relates to an excimer laser apparatus which uses a fluoric gas as a laser medium. In a specific aspect, the invention relates to an excimer laser apparatus having improved dust particle removal means and a contamination preventing mechanism for windows thereof.

BACKGROUND OF THE INVENTION

The dust particle removal means of conventional excimer laser apparatus are available in two types, one of which uses a filter (refer to Japanese Published Unexamined Patent Application (A) 4-137574; "Control Of Contaminants In XeCl Lasers", *LASER FOCUS WORLD*, p. 65–68, October 1981; and others), and the other of which uses a static dust particle remover (refer to Japanese Published Unexamined Patent Application (A) 58-186985; U.S. Pat. No. 5,027,366; and U.S. Pat. No. 5,029,177).

As regards the filters, stainless steel mesh filters which are anti-corrosive to fluoric gas have been used. However, if these mesh filters are used in an excimer laser apparatus which employs a fluorine based gas (mainly, XeF, KrF and ArF), chromium on the surfaces of the stainless steel fibers which form the mesh reacts with $F_2$ contained in a laser medium gas to produce a chromium fluoride. A low value chromium fluoride, for example, $CrF_2$, remains as is on the surfaces of the stainless steel filters, as its vapor pressure is high. However, a high value chromium fluoride, for example, $CrF_5$, is mostly a gas at the temperatures of a normal laser medium gas, as its vapor pressure is high, and is therefore mixed with the laser medium gas. In laser oscillation to be carried out with a laser medium gas containing $CrF_5$, any gaseous $CrF_5$ near the windows which transmit the laser beam is decomposed by the ultraviolet radiation of the excimer laser, and Cr is caused to be deposited on the windows. Consequently, there will be a problem in that the Cr deposits will cloud the windows, lowering the transmission ratio of the laser beam through the windows and reducing the output of the laser beam.

On the other hand, in case of the filters made of an organic material, for example, polytetrafluoroethylene filters, there is a problem in that water and the fluorine in the polytetrafluoroethylene react to produce HF, and $CF_4$ is produced by the laser beam, thereby reducing the laser output.

Figure 10:
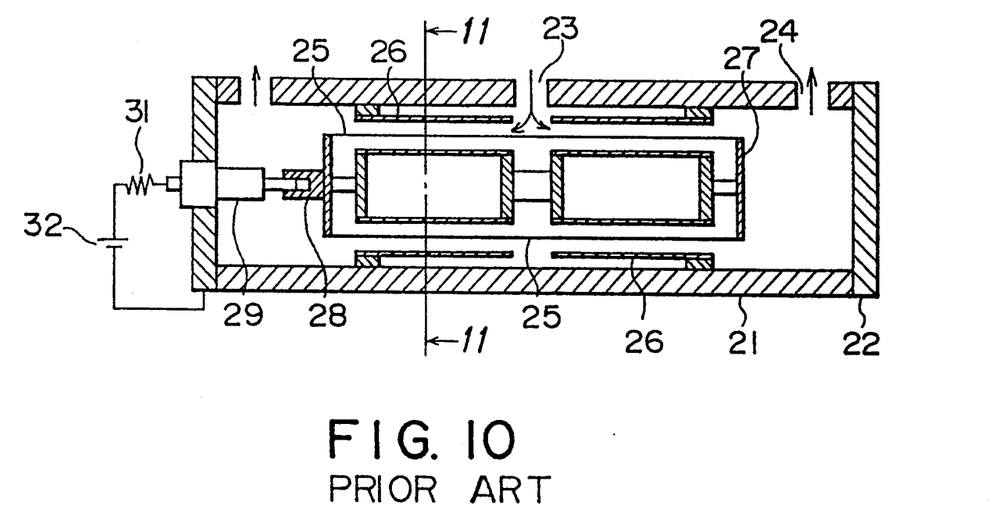
FIG. 10 is a longitudinal sectional view of a static dust particle remover according to the prior art.
Figure 11:
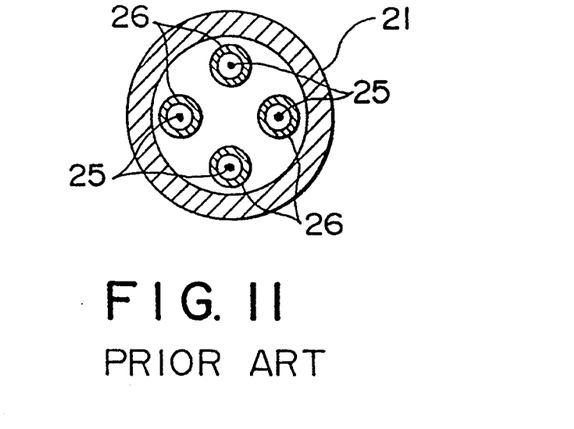
FIG. 11 is a transverse sectional view taken along line 11—11 in FIG. 10.

As shown in FIGS. 10 and 11, a conventional static dust particle remover comprises a dust particle removal case 21, a case cover 22, an inlet 23, an outlet 24, wire electrodes 25 to which a high voltage is applied, cylindrical electrodes 26 having a ground potential, wire electrode support plates 27, current introduction terminal blocks 28 and 29, a stabilizing resistor 31, and a high voltage power supply 32. A high voltage current from the high voltage power supply 32 is introduced into wire electrodes 25 through the stabilizing resistor 31 and the current introducing terminal 29. The four wire electrodes 25 are connected to the wire electrode support plate 27 at the front side and to the wire electrode support plate 27 at the rear side, so that they are in parallel with each other, with each wire electrode 25 having first and second portions connected in series, with the first portion being in a front static dust particle remover and the second portion being in a rear static dust particle remover, as shown in FIG. 10. The front cylindrical electrodes 26 are connected to the dust particle removal case 21 at the front side, and the rear cylindrical electrodes 26 are connected to the dust particle removal case 21 at the rear side. A laser medium gas containing dust particles enters into the dust removal case 21 through the inlet 23 provided at the central position of the dust removal case 21, and dust particles are collected by four cylindrical electrodes 26 and wire electrodes 25 which are arranged in parallel connection. Then the gas is discharged from the outlet 24.

When such cylindrical static dust particle removers are operated for a long period of time, wire electrodes 25 will become disconnected due to wear or unable to discharge due to an insulation layer formed by the deposition of dust particles, and therefore dust removal will not be carried out. If a wire electrode 25 is disconnected, two types of results are expected, depending on the pattern of connection after the point of disconnection. When a broken wire electrode 25 comes into contact with a cylindrical electrode 26, the protection circuit of the high voltage power supply 32 operates to prevent the high voltage from being applied to the other wire electrodes 25. When a broken wire electrode 25 does not come in contact with any other part, the associated cylindrical electrode 26 does not function as a static dust particle remover, and all dust particles which have passed through the associated cylindrical electrode 26 enter into the clean side. The detection of any abnormality in this case is difficult and, even though the abnormality of the static dust particle removers can be detected by providing an abnormality detector, the cross flow fan which circulates the gas does not stop immediately, and therefore the clean side of the static dust particle removers can become contaminated. When this phenomenon occurs, it is necessary to clean off all dust particles deposited at the clean side, and it takes a long period of time to recover the normal condition.

The operating conditions of the static dust particle removers vary with the degree of accumulation of dust particles in the static dust particle removers, along with the increase of operating time of the excimer laser apparatus. For this reason, the static dust particle removers are operated according to the operating condition as the maximum common measure obtained in view of a time dependent change of accumulated dust particles. However, this method makes it difficult to operate the static dust particle removers with satisfactory efficiency of dust collection throughout the overall operating time. Particularly, in the latter half of the service life of the static dust particle removers, when much dust has been deposited thereon, the quantity of dust particles which cannot be collected by the static dust particle removers and which accordingly passes to the downstream side will increase. The static dust particle removers should be large-sized to prevent such undesirable accumulation of dust particles.

In addition, the contamination of the optical system is one of the detrimental factors to the extension of the service life of the laser oscillation. When dust particle compounds or the like, produced by repeated laser oscillation, deposit on the window, the transmission ratio of the laser beam is reduced and the laser output deteriorates. The inventions disclosed in Japanese Published Examined Patent Application (B2) 60-26312 and U.S. Pat. No. 5,018,161 specify that a gas, purified through the filters, be forcibly blown against the window surfaces, and therefore require a great volume of purging gas to prevent involving the laser medium gas containing dust. Meantime, the invention disclosed in Japanese Published Unexamined Patent Application (A) 58-186985 specifies a system for cleaning the windows with a clean gas by providing a gas inlet for purified gas in the window areas and a gas circulating passage which reaches the gas inlet through the gas outlet of the discharge tube to the electric dust collector and the standstill zone. However, the gas circulating passage is installed outside the discharge tube and therefore there is a possibility of an increase in the cavity length and leakage from piping connections. Moreover, the above invention includes a problem in that the aperture mask of the conventional apparatus provided outside the chamber reacts with the ultraviolet radiation and the atmospheric gas to result in deterioration, or impurities are produced to contaminate ambient optical components.

SUMMARY OF THE INVENTION

In view of the above problems, an object of the present invention is to provide an excimer laser apparatus which does not react with fluoric gases, which is provided with compact high efficiency dust particle removal means without discharging collected dust particles to the clean side upon the occurrence of an abnormality, which is capable of maintaining the windows clean with a small volume of purging gas, and which is capable of preventing deterioration of the aperture masks without an increase in the cavity length and leakage from piping connections.

A first embodiment of the present invention employs a filter made of a material which is non-reactive with fluoric gases, as a means for removing dust particles dispersed in the laser medium gas. For such excimer laser apparatus, the base material or the coating material for the filters can be a metal which is non-reactive with fluoric gases, for example, nickel, cobalt, iron, copper, aluminum, gold, platinum, or an alloy of two or more of these metals, or a ceramic material which is non-reactive with fluoric gases, for example, an alumina ceramic ($Al_2O_3$).

As an alternative, a fluorinated passivation film can be formed on the surfaces of the filters. For example, stainless steel can be employed as the base material for the filters and the fluorinated passivation film can be formed on the stainless steel surfaces.

The structure as described above prevents a reaction of the fluorine in the laser medium gas with the material of the filters. Dust particles in the laser medium gas can be stably filtered by using such filters as dust particle removal means for the excimer laser gas containing fluorine without any adverse influence on the laser medium gas.

A second embodiment of the present invention employs as dust particle removal means a static dust particle remover, having an anode and a cathode, in combination with a dust particle collector at the downstream side of the static dust particle remover for collecting any dust particles which pass through the static dust particle remover. A labyrinth having a ground potential, or metal mesh filters having a ground potential, or ceramics filters can be used as the dust particle collector.

The structure as described above enables the collection of charged dust particles which have passed through the static dust particle removers, by making use of the Coulomb energy, intermolecular force and inertia. On the other hand, dust particles, which are not charged, can be collected by making use of the intermolecular force and inertia.

A third embodiment of the present invention has dust particle removal means for cleaning the laser medium gas, and is structured to provide subchambers for housing labyrinths adjacent the insides of the windows on the laser beam path, so that laser medium gas which has been cleaned in the dust particle removal means can be introduced through the subchambers into the laser chamber, thereby protecting the clean gas medium adjacent the windows.

The laser medium gas passage from the dust particle removal means to the subchambers can be built in the side wall of the chamber. The aperture mask for shaping the profile of the laser beam is mounted in a clean laser medium gas atmosphere. This structure allows a clean laser medium gas to always be near the inside surfaces of the windows. Accordingly, the laser medium gas containing dust particles does not reach the inside surfaces of the windows, and the window surfaces can be kept clean without having to blow a great volume of purging gas onto the windows. This structure avoids problems such as leakage of piping connections and having to increase the cavity length. In addition, such problems as contamination or deterioration of the aperture mask or contamination or the like of ambient optical components due to impurities can be prevented.

DETAILED DESCRIPTION

Figure 1:
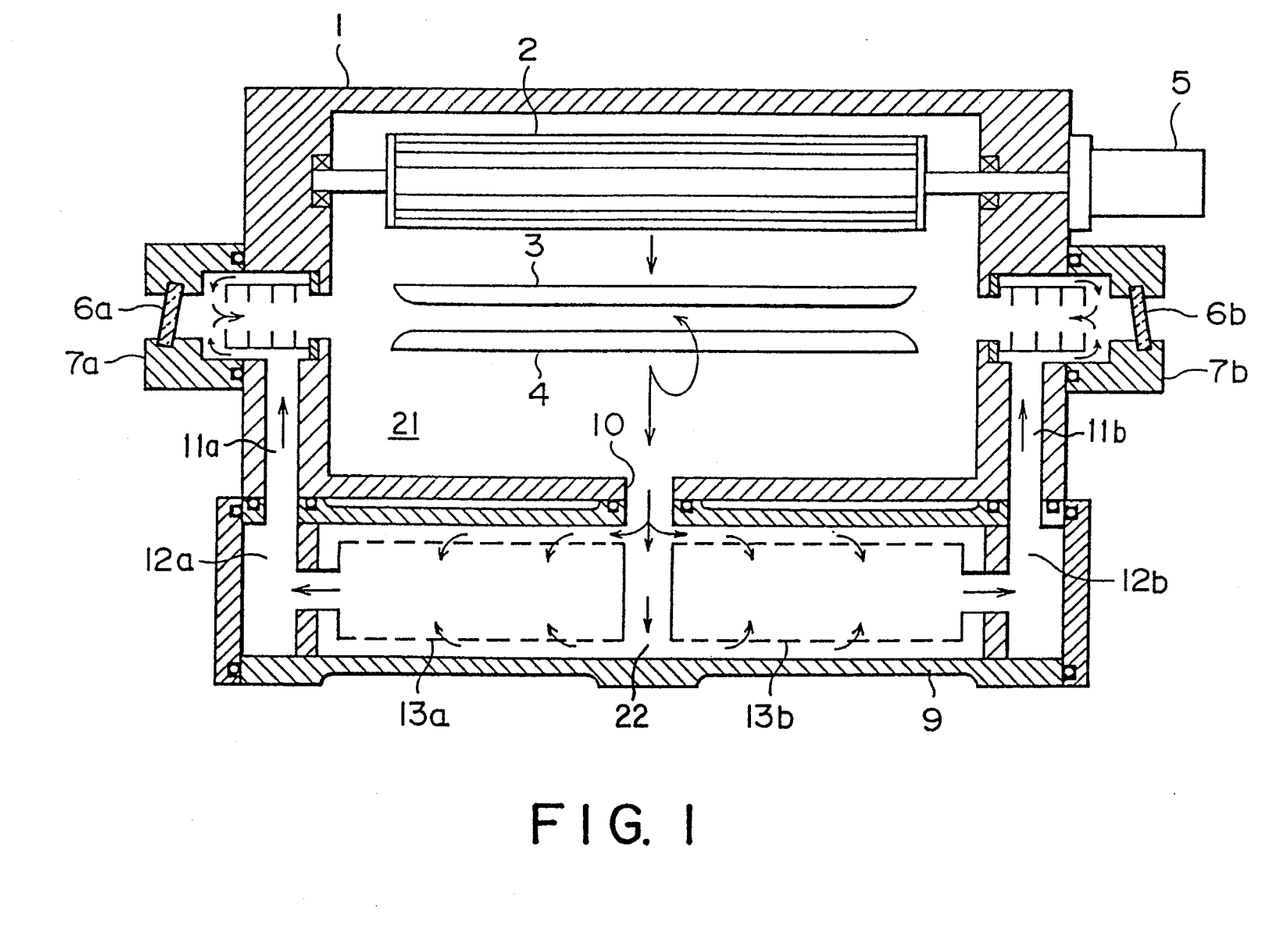
FIG. 1 is a longitudinal sectional view showing a typical construction of an excimer laser apparatus in accordance with the first embodiment of the present invention.
Figure 2:
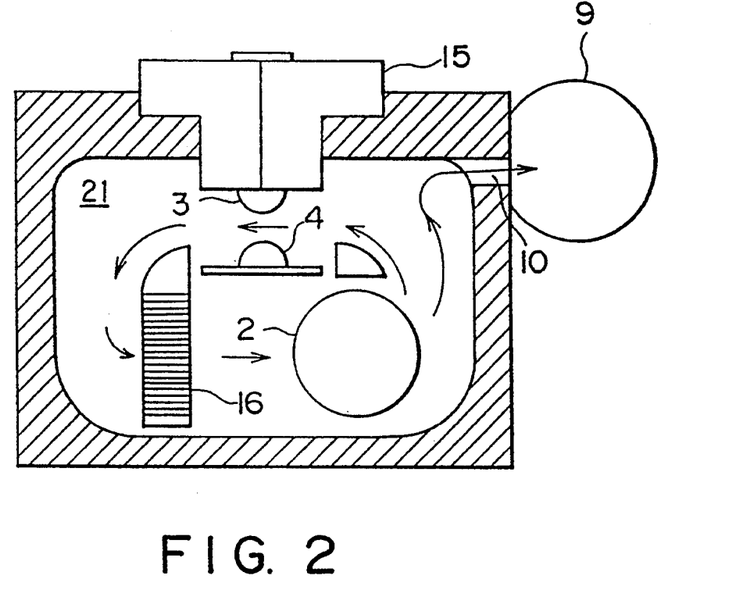
FIG. 2 is a transverse sectional view of a chamber of the excimer laser apparatus of FIG. 1.

FIGS. 1 and 2 illustrate an excimer laser apparatus in accordance with a first embodiment of the present invention. In FIG. 1, a chamber 21 of a laser housing 1 is filled with laser medium gas, which is circulated by a fan 2 driven by a motor 5. The windows 6a and 6b are arranged in window holders 7a and 7b, respectively, and are located at opposite ends of the chamber 21 so as to be coaxial with each other, with the main electrodes 3 and 4 being positioned between the windows 6a and 6b. A dust particle removal case 9 is coupled to the laser housing 1, with the dust particle removal case 9 having an elongated chamber 22 which is approximately the length of chamber 21. An inlet 10 from the chamber 21 into the chamber 22 of the dust particle removal case 9 is provided at approximately the midpoint of the chamber 21 along a line parallel to the direction of the optical axis. The gas introducing passage 11a is provided in the left end wall of laser housing 1, while the gas introducing passage 11b is provided in the right end wall of the housing 1, with each gas introducing passage 11a, 11b being in communication with a respective one of the outlets 12a and 12b provided at opposite ends of chamber 22 in the dust removal case 9. A front side mesh filter 13a and a rear side mesh filter 13b are arranged coaxially, with each extending just less than one half of the length of the chamber 22 of the dust particle removal case 9. As shown in FIG. 2, an insulation member 15 provides support for electrode 3 in chamber 21, and a heat exchanger 16 is positioned in the gas flow path in chamber 21.

The surfaces of each of mesh filters 13a, 13b which are exposed to the laser medium gas can be formed of a metal which is non-reactive with the laser medium gas, e.g., nickel, cobalt, iron, copper, aluminum, gold, platinum, or an alloy of two or more of these metals, or a metal oxide ceramic which is non-reactive with the laser medium gas, by forming the exposed portions of the mesh filter elements entirely from these metals or alloys or ceramics, or by forming the exposed portions from a base material, e.g., stainless steel, and then coating the exposed base material surfaces with at least one of the foregoing metals or alloys or ceramics. Suitable metal oxide ceramics include, for example, high purity (>99.5%) $Al_2O_3$. In addition, a fluorinated passivation film can be formed on the metal or ceramic exposed surfaces of mesh filters 13a and 13b. For forming the fluorinated passivation film, the surfaces of the mesh filters can be fluorinated by heating the filters to approximately 300° C. in an oven and exposing the thus heated mesh filters to a fluoric gas atmosphere, thereby forming a stable fluoride film on the exposed surfaces of the mesh filters. Thus, the laser medium gas will rarely react with fluorine under the operating conditions in such apparatus.

The fan 2 circulates the laser medium gas between the main electrodes 3 and 4 and then through the heat exchanger 16 for cooling before the laser medium gas is returned to the fan 2, as shown in FIG. 2. A flow of the laser medium gas in the dust particle removal case 9 is caused by utilizing a pressure difference produced by the fan 2, so that the laser medium gas enters into the chamber 22 in the dust removal case 9 through the inlet 10 and then splits into two flow paths for passing through the mesh wall of one of the stainless steel mesh filters 13a and 13b for filtering dust particles from the laser medium gas. The mesh filters 13a and 13b are, for example, treated with a fluorinated passivation film. The required performances of mesh filters 13a and 13b are such that the pressure drop across each mesh filter is at least about 10 mmAq and the filtration accuracy is a few $\mu$m (gas). A differential pressure in the dust particle removal case 9 brought about by the fan 2 is at least about 10 mmAq and the pressure drop across each filter increases in accordance with accumulation of dust particles on mesh filters 13a and 13b, and therefore the filtering area of mesh filters 13a and 13b should be as large as practical. For this reason, the mesh filters 13a and 13b preferably employ a pleat-folded mesh filter element. Purified laser medium gas passing through the mesh filter 13a is returned into the chamber 21 through outlet 12a and passageway 11a. Purified laser medium gas passing through the mesh filter 13b is returned into the chamber 21 through outlet 12b and passageway 11b.

Although this embodiment employs filters 13a and 13b made with stainless steel meshes which are heated at a high temperature and treated to provide a fluorinated passivation film in a fluoric gas atmosphere, the present invention is not limited to this embodiment. Any method for developing a stable fluorinated passivation film on the metal surface can be employed, for example, film deposition or electrolysis is available. With film deposition or electrolysis, any kind of material can be used as the base material.

This embodiment of the invention prevents the reaction of fluorine contained in the laser medium gas with the material of the mesh filters 13a and 13b, and allows dust particles dispersed in the laser medium gas to be filtered out without any adverse influence to the laser medium gas. The provision of the fluorinated passivation film permits the use of stainless steel, which is relatively easily obtained, to form the mesh filters.

The second embodiment of the excimer laser apparatus in accordance with the present invention is illustrated in FIGS. 3 to 7. The structural components which are the same as in the first embodiment are given the same reference numbers, and therefore a detailed description thereof is not repeated.

Figure 3:
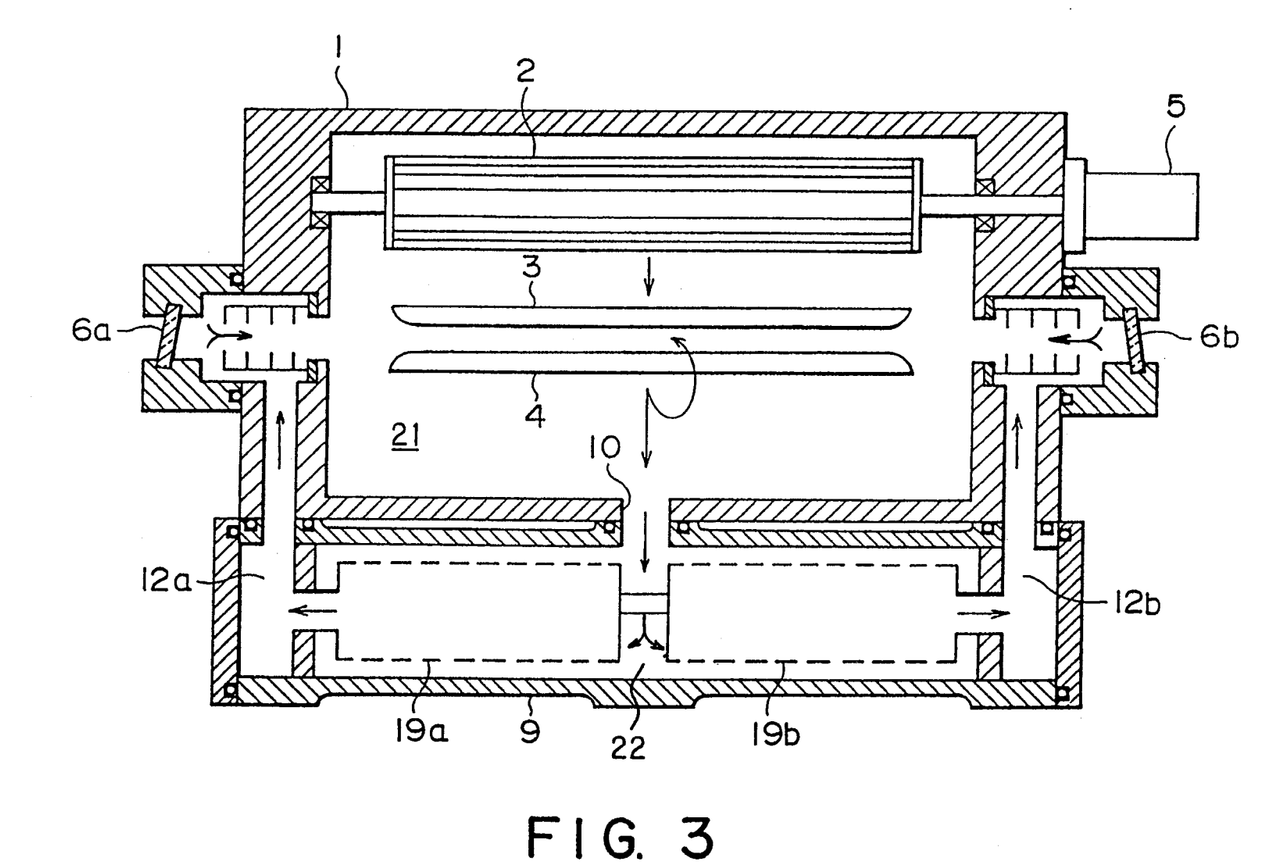
FIG. 3 is a longitudinal sectional view showing a typical construction of an excimer laser apparatus in accordance with the second embodiment of the present invention.

In FIG. 3, showing the general view of the excimer laser apparatus, a front side static dust particle remover 19a and a rear side static dust particle remover 19b are installed in the chamber 22 of the cylindrical dust particle removal case 9 provided adjacent to the chamber 21.

Figure 4:
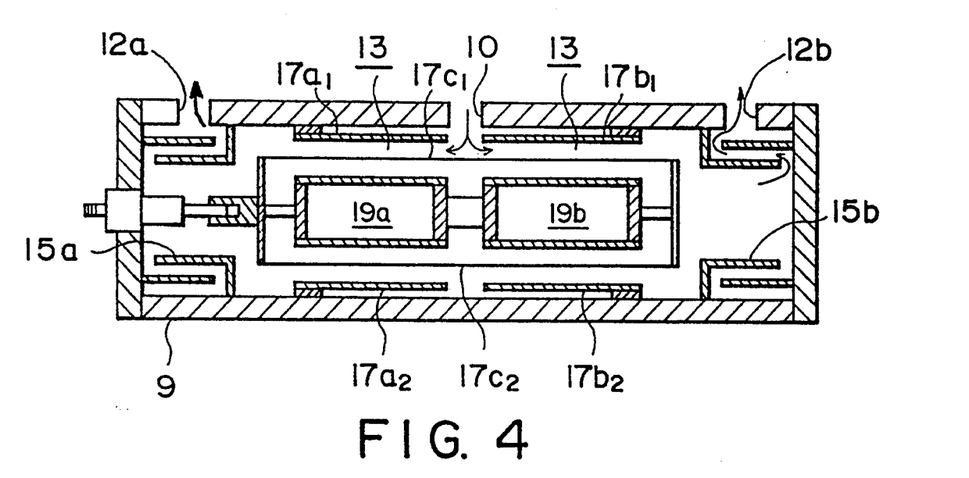
FIG. 4 is a longitudinal sectional view of a static dust particle remover in accordance with the second embodiment.

FIG. 4 is a longitudinal sectional view of the dust particle removal case 9 and the dust collecting labyrinths 15a and 15b which are respectively provided at the downstream side of the static dust particle removers 19a and 19b. In the static dust particle removers 19a and 19b, a plurality of ground potential cylindrical electrodes $17a_1$, $17a_2$ and $17b_1$, $17b_2$ are arranged parallel to the flow of laser gas through chamber 22. Wire electrodes $17c_1$ and $17c_2$, to which a negative high voltage is applied, are provided respectively at the central positions of the cylindrical electrodes $17a_1$, $17a_2$ and $17b_1$, $17b_2$. In this embodiment, although aluminum is used for the cylindrical electrodes $17a_1$, $17a_2$, $17b_1$, and $17b_2$ and nickel is used for the wire electrodes $17c_1$ and $17c_2$, the material for these electrodes is not limited to these metals. In the case of a fluorine-based excimer laser which uses a substance with a sufficient durability against halogen gas, satisfactory results are obtained when an electrode material which is non-reactive with the laser medium gas, e.g., nickel, iron, cobalt, aluminum, copper, gold, platinum, or an alloy containing any two or more of these metals, is used either as the sole material or as the plating material for coating the exposed surfaces of the electrodes. As examples, Monel metal, brass and hastelloy B are available.

The labyrinths 15a and 15b are provided at the opposite ends of chamber 22, such that chamber 22 communicates with outlets 12a, 12b through a respective one of the labyrinths 15a, 15b. The labyrinths 15a and 15b can be made by concentrically arranging a plurality of plates with a fixed clearance between adjacent plates and held to the same ground potential as cylindrical electrodes $17a_1$, $17a_2$ and $17b_1$, $17b_2$, such that the flow of gas through a labyrinth follows a convoluted path in which the flow direction is reversed one or more times, preferably by 180 degrees. After the laser medium gas introduced through the inlet 10 is charged and dust is collected, the at least partially purified laser medium gas enters into labyrinths 15a and 15b and then reaches the outlets 12a and 12b. Dust particles which were not removed by the static dust particle removers 19a and 19b and which are charged with a minus potential are absorbed by the labyrinths 15a and 15b when they pass through the narrow spaces of the labyrinths 15a and 15b. On the other hand, even dust particles which are not charged collide with the walls of the labyrinths 15a or 15b due to inertia when the gas flow reverses its direction 180 degrees, and thereby deposit on the labyrinths 15a and 15b.

Figure 5:
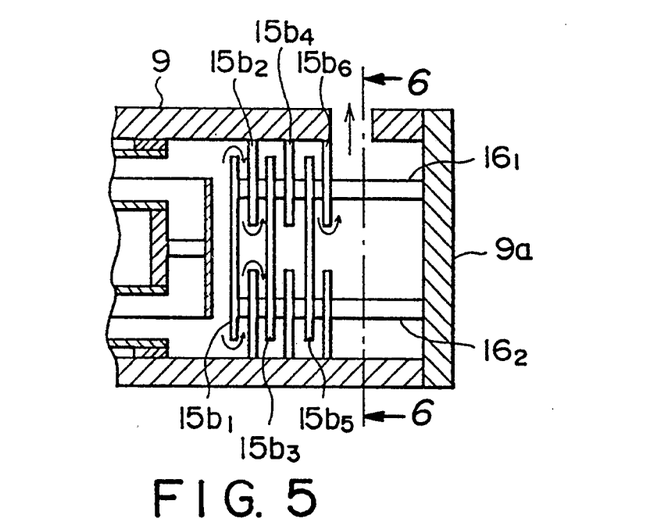
FIG. 5 is a partial longitudinal sectional view of an application example in accordance with the second embodiment.
Figure 6:
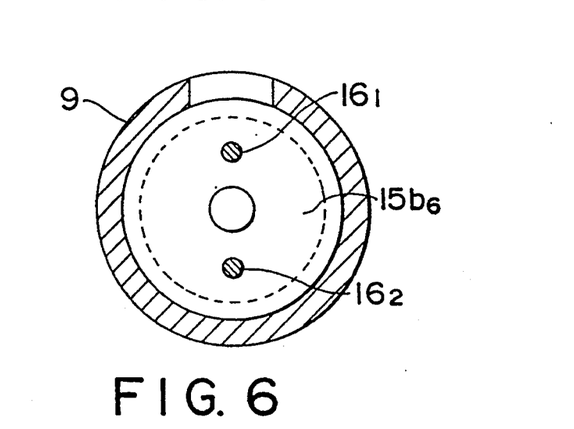
FIG. 6 is a transverse sectional view taken along line 6—6 in FIG. 5.

An application example of the second embodiment of the invention is illustrated in FIGS. 5 and 6. In FIG. 5, showing a partial sectional view of the rear side static dust particle remover 19b, labyrinth elements $15b_1$, $15b_2$, $15b_3$, $15b_4$, $15b_5$ and $15b_6$ are formed by vertically arraying a plurality of discs coaxially with the longitudinal axis of the dust particle removal case 9. Labyrinth elements $15b_1$, $15b_3$, and $15b_5$ are discs having a diameter less than the diameter of the chamber 22 in dust removal case 9. Labyrinth elements $15b_2$, $15b_4$, and $15b_6$ are discs having a diameter at least substantially equal to the diameter of chamber 22 in dust removal case 9. Each of labyrinth elements $15b_2$, $15b_4$, and $15b_6$ has a hole at its center, and the discs $15b_2$, $15b_4$, and $15b_6$ alternate with disc $15b_1$, $15b_3$, and $15b_5$ with a fixed clearance between adjacent discs. These discs are fixed to the dust removal case cover 9a by supports $16_1$ and $16_2$. Labyrinth elements $15b_1$, $15b_2$, $15b_3$, $15b_4$, $15b_5$ and $15b_6$ can have other shapes and structures if they are capable of utilizing mainly the inertia owing to the Coulomb energy of the dust particles.

As described above, dust particles which pass through the static dust particle removers 19a and 19b into the labyrinths 15a, 15b are collected therein by the deposition of dust particles which are charged with minus potential, and by the deposition of uncharged dust particles due to their inertia. Therefore some slight deterioration of the dust collecting efficiency of the static dust particle removers 19a and 19b is allowable.

The front side static dust particle remover 19a in this structure is the same as the rear side static dust particle remover 19b, and therefore the description is not repeated.

Figure 7:
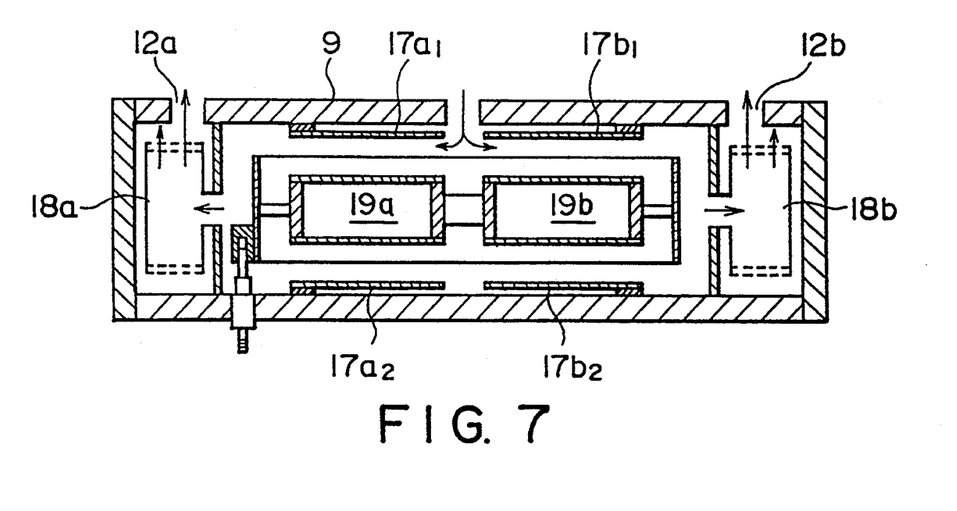
FIG. 7 is a longitudinal sectional view of another application example in accordance with the second embodiment.

FIG. 7 shows another application example of the second embodiment of the invention in which stainless steel mesh filters 18a and 18b, which have been treated by fluorinated passivation, are arranged, instead of the labyrinths, at the downstream side of the static dust particle removers 19a and 19b installed in the dust particle removal case 9. Mesh filters 18a and 18b are held to the same ground potential as cylindrical electrodes $17a_1$, $17a_2$, $17b_1$ and $17b_2$. If mesh filters capable of collecting almost all of the dust particles dispersed in the laser medium gas in the chamber 21 are selected as filters 18a and 18b (in this embodiment, the filters with a gas collection efficiency of 0.5 μm are used), there is rarely a possibility of leakage of dust particles at the outlets 12a and 12b. This gas collection efficiency means removal of at least 98 weight % of the particles, larger than the specified micron value, in terms of the weight of these particles. Almost all of the dust particles are collected by the static dust particle removers 19a and 19b, and therefore the quantity of dust particles which should be collected by these mesh filters 18a and 18b is very small. Although the specifications of the mesh filters 18a and 18b for the excimer laser apparatus require the pressure drop across each filter of at least about 10 mmAq and a filtration accuracy of a few μm below the decimal point (gas), the filtering area of the mesh filters 18a and 18b can be small and therefore a large space is not required for installation.

According to this embodiment, dust particles which pass through the static dust particle removers 19a and 19b can be collected by utilizing the Coulomb energy, intermolecular force and inertia, and therefore a great volume of dust particles can be collected without having to increase the capacities of the static dust particle removers 19a and 19b. In addition, the allowable range of operating conditions of static dust particle removers 19a and 19b can be expanded, and the laser unit can be operated for a short period of time even though the static dust particle removers 19a and 19b do not function.

Figure 8:
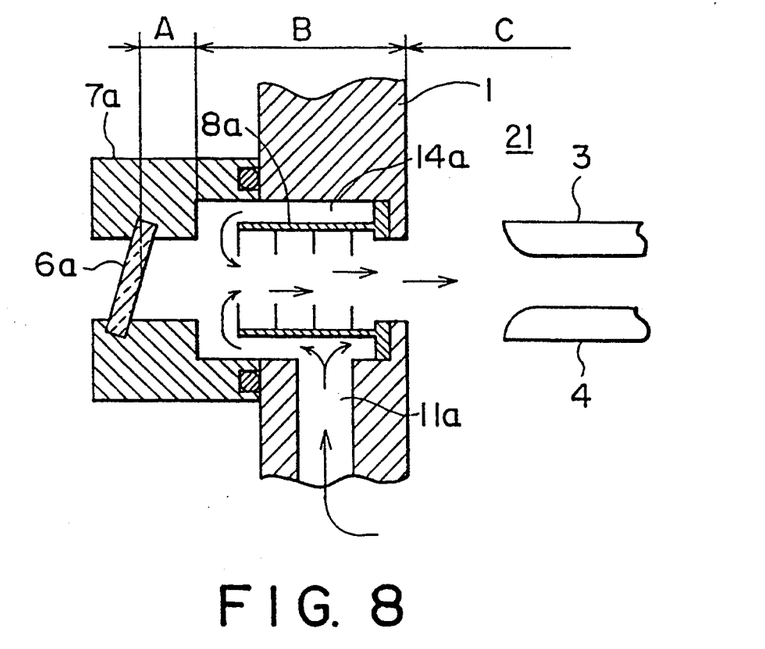
FIG. 8 is a partial longitudinal sectional view showing a window and its surroundings in an excimer laser apparatus in accordance with the third embodiment of the present invention.
Figure 9:
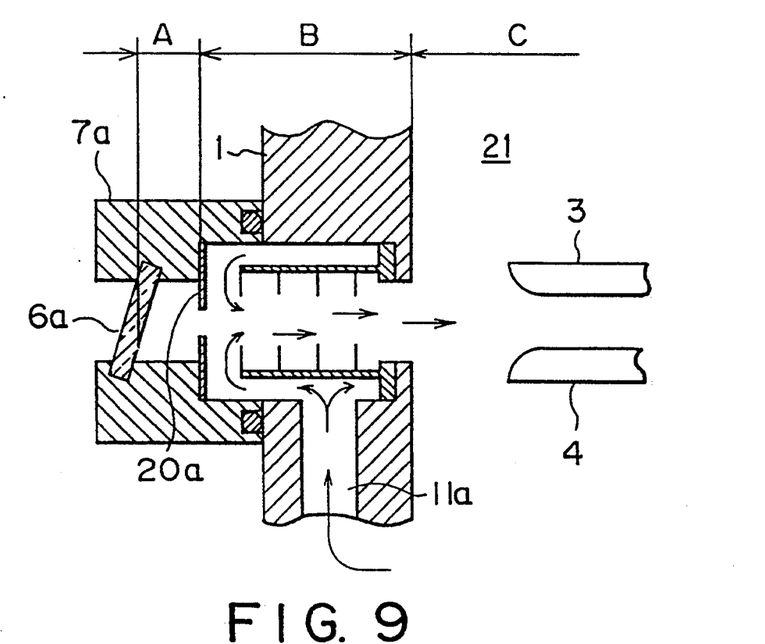
FIG. 9 is a partial longitudinal sectional view of a window and its surroundings including the aperture mask according to the third embodiment of the present invention.

A third embodiment of the excimer laser apparatus in accordance with the present invention is illustrated in FIGS. 8 and 9. The structural components which are the same as in the first and second embodiments are given the same reference characters, and a detailed description is not repeated.

In FIG. 8, showing a partial longitudinal sectional view of the front side of the excimer laser apparatus, cleaned gas passes through the gas introducing passage 11a inside the wall of the housing 1 and enters into the subchamber 14a which houses the labyrinth 8a. The subchamber 14a is provided in the laser beam path to form a buffer area B for stabilizing the incoming gas flow. The purified gas passes from the passage 11a through the labyrinth 8a and into the discharging area C in the chamber 21, that is, in the direction of main electrodes 3 and 4 without significantly disturbing clean gas which stays in the static (very low gas flow) area A near the internal surface of window 6a. Accordingly, gas containing dust particles in the discharging area C is prevented from flowing towards the window 6a.

FIG. 9 shows a partial sectional view of the front side of the excimer laser apparatus in which an aperture mask 20a is fitted for shaping the laser beam. The aperture mask 20a is fitted at the bottom of the stepped hole of the window holder 7a, that is, at the boundary of the stationary area A and the buffer area B. Accordingly, the aperture mask 20a is always kept in a clean laser medium gas and can be free from deficiencies such as contamination and deterioration by selecting appropriate materials. For example, in case of the excimer laser apparatus which uses fluorine as the laser medium gas, satisfactory results are obtained by using the aperture mask 20a made of nickel-plated aluminum. The aperture mask 20a serves as a partition which separates the stationary area A from the buffer area B to ensure further stability of the area A.

Since the rear side of the excimer laser apparatus is the same as the structure of the front side, a detailed description thereof is not repeated.

According to this third embodiment of the invention, clean laser medium gas can stay near inside the windows 6a and 6b. Therefore the laser medium gas containing dust particles dispersed therein in the discharging area C does not reach the internal surfaces of windows 6a and 6b, and the surfaces of windows 6a and 6b can always be kept clean without blowing a great volume of purging gas thereagainst. Thus, the cavity length does not have to be increased, and the possibility of leakage from piping connections is avoided. In addition, since the excimer laser apparatus is arranged with a clean laser medium gas atmosphere against the inside surfaces of the windows 6a and 6b, the problems such as the contamination and deterioration of the aperture masks 20a and 20b and the contamination of the ambient optical components due to impurities can be prevented, and an exclusive purging gas mechanism for the aperture masks 20a and 20b is not required. The laser medium gas where the aperture masks 20a and 20b are installed is completely dry and the only gas which can cause a chemical reaction is a halogen, and therefore the selection of materials for the aperture masks 20a and 20b is easy. Moreover the aperture masks 20a and 20b are able to stably maintain clean medium gas in the stationary area A, thereby further increasing the preventive effect against contamination of the windows 6a and 6b.

Reasonable variations and modifications are possible within the scope of the foregoing description and the appended claims to the invention.

What is claimed is:

1. An excimer laser apparatus comprising:
a housing defining a laser chamber;
first and second windows in said housing at opposite ends of said laser chamber;
first and second main electrodes, positioned in said laser chamber intermediate said first and second windows, for generating a laser beam;
a heat exchanger;
a fan for continuously circulating a laser medium gas between said main electrodes and then through said heat exchanger for cooling said laser medium gas;
a dust particle removal case having a collection chamber in communication with said laser chamber; and
at least one dust particle filter provided in said collection chamber for removing dust particles dispersed in said laser medium gas, each said dust particle filter being made of a material which is non-reactive with the laser medium gas.

2. An excimer laser apparatus in accordance with claim 1, wherein each said dust particle filter is a mesh filter.

3. An excimer laser apparatus in accordance with claim 2, wherein any exposed surfaces of each said mesh filter are made of at least one member selected from the group consisting of nickel, cobalt, iron, copper, aluminum, gold, platinum, and mixtures of at least two thereof.

4. An excimer laser apparatus in accordance with claim 2, wherein any exposed surfaces of each said mesh filter are made of a ceramic material which is non-reactive to fluoric gases.

5. An excimer laser apparatus in accordance with claim 1, wherein a fluorinated passivation film is formed on any exposed surfaces of said at least one dust particle filter.

6. An excimer laser apparatus in accordance with claim 1, wherein said at least one dust particle filter is formed of stainless steel with a fluorinated passivation film formed on any exposed surfaces thereof.

7. An excimer laser apparatus in accordance with claim 1, wherein said housing further defines a first subchamber between said first window and said laser chamber and a second subchamber between said second window and said laser chamber, a first labyrinth positioned in said first subchamber, a second labyrinth positioned in said second subchamber, a first conduit for passing laser medium gas purified by said at least one dust particle filter through said first labyrinth into said laser chamber and a second conduit for passing laser medium gas purified by said at least one dust particle filter through said second labyrinth into said laser chamber to prevent contamination of said first and second windows.

8. An excimer laser apparatus in accordance with claim 7, wherein said first and second conduits are formed in a wall of said housing.

9. An excimer laser apparatus in accordance with claim 7, wherein a first aperture mask is provided in a clean laser medium gas atmosphere between said first window and said first labyrinth, and wherein a second aperture mask is provided in a clean laser medium gas atmosphere between said second window and said second labyrinth.

10. An excimer laser apparatus in accordance with claim 9, wherein each said dust particle filter is a mesh filter.

11. An excimer laser apparatus in accordance with claim 1, wherein each said dust particle filter comprises a static dust particle remover having an anode and a cathode, and a ground potential dust collector, provided at the downstream side of said static dust particle remover, for collecting dust particles which pass through said static dust particle remover.

12. An excimer laser apparatus comprising:
a housing defining a laser chamber;
first and second windows in said housing at opposite ends of said laser chamber;
first and second main electrodes, positioned in said laser chamber intermediate said first and second windows, for generating a laser beam;
a heat exchanger;
a fan for continuously circulating a laser medium gas between said main electrodes and then through said heat exchanger for cooling said laser medium gas;
a dust particle removal case having a collection chamber in communication with said laser chamber; and
at least one dust particle filter provided in said collection chamber for removing dust particles dispersed in said laser medium gas, each said dust particle filter comprising a static dust particle remover having an anode and a cathode, and a ground potential dust collector, provided at the downstream side of said static dust particle remover, for collecting dust particles which pass through said static dust particle remover.

13. An excimer laser apparatus in accordance with claim 12, wherein each ground potential dust collector comprises a ground potential labyrinth.

14. An excimer laser apparatus in accordance with claim 12, wherein each ground potential dust collector comprises a ground potential mesh filter.

15. An excimer laser apparatus in accordance with claim 14, wherein each ground potential mesh filter is made of a material which is non-reactive with the laser medium gas.

16. An excimer laser apparatus in accordance with claim 12, wherein said housing further defines a first subchamber between said first window and said laser chamber and a second subchamber between said second window and said laser chamber, a first labyrinth positioned in said first subchamber, a second labyrinth positioned in said second subchamber, a first conduit for passing laser medium gas purified by said at least one dust particle filter through said first labyrinth into said laser chamber and a second conduit for passing laser medium gas purified by said at least one dust particle filter through said second labyrinth into said laser chamber to prevent contamination of said first and second windows.

17. An excimer laser apparatus in accordance with claim 16, wherein said first and second conduits are formed in a wall of said housing.

18. An excimer laser apparatus in accordance with claim 16, wherein a first aperture mask is provided in a clean laser medium gas atmosphere between said first window and said first labyrinth, and wherein a second aperture mask is provided in a clean laser medium gas atmosphere between said second window and said second labyrinth.

19. An excimer laser apparatus in accordance with claim 18, wherein each ground potential dust collector comprises a ground potential labyrinth.

20. An excimer laser apparatus in accordance with claim 18, wherein each ground potential dust collector comprises a ground potential mesh filter.

* * * * *